United States Patent [19]

Fauteux et al.

[11] Patent Number: 5,217,827
[45] Date of Patent: Jun. 8, 1993

[54] ULTRATHIN POLYMER ELECTROLYTE HAVING HIGH CONDUCTIVITY

[75] Inventors: Denis Fauteux, Centerville, Ohio; S. Yde-Andersen, Odense, Netherlands

[73] Assignee: MHB Joint Venture, San Jose, Calif.

[21] Appl. No.: 823,575

[22] Filed: Jan. 16, 1992

Related U.S. Application Data

[63] Continuation of Ser. No. 530,497, May 30, 1990, abandoned, which is a continuation of Ser. No. 243,357, Sep. 12, 1988, abandoned.

[51] Int. Cl.$^5$ .............................................. H01M 10/40
[52] U.S. Cl. ..................................... 429/192; 252/62.2
[58] Field of Search ........................ 429/192; 252/62.2

[56] References Cited

U.S. PATENT DOCUMENTS

| | | | |
|---|---|---|---|
| 4,303,748 | 12/1981 | Armand et al. | 429/192 |
| 4,357,401 | 11/1982 | Andre et al. | 429/192 |
| 4,654,279 | 3/1987 | Bauer et al. | 429/192 |
| 4,728,588 | 3/1988 | Noding et al. | |
| 4,792,504 | 12/1988 | Schwab et al. | 252/62.2 X |
| 4,822,701 | 4/1989 | Ballard et al. | 429/192 |
| 4,908,283 | 5/1990 | Takahashi et al. | 492/192 |

FOREIGN PATENT DOCUMENTS

| | | |
|---|---|---|
| 0145498 | 12/1984 | European Pat. Off. |
| 0260847 | 3/1988 | European Pat. Off. |
| 0269018 | 6/1988 | European Pat. Off. |
| 0279554 | 8/1988 | European Pat. Off. |
| 0301774 | 2/1989 | European Pat. Off. |
| 2493609 | 5/1982 | France |
| 2556139 | 7/1985 | France |
| 63-9463 | 4/1988 | Japan |

OTHER PUBLICATIONS

Hardy, L. C. "Solid Polymer Electrolytes" *J. Electrochemical Society* 131:38-39 (1984).

Nagai "Lithium Battery" *Patent Abstracts of Japan* JP-A-62 219 469 (1988).

Takahashi "Solid Electrolyte Battery" *Database WPIL* JP-a-63 094 563 (date unknown).

*Primary Examiner*—Stephen Kalafut
*Attorney, Agent, or Firm*—Cooley, Godward, Castro, Huddleson and Tatum

[57] ABSTRACT

An electrolyte composition for a solid state electrochemical cell comprising at least 65% by weight of a plasticizer, a thermoplastic or thermoset polymer derived from monomers containing a heteroatom and a dissolved alkali metal salt; this composition is useful in providing electrolyte layers less than 100 microns thick for solid state electrochemical cells having a very thin construction.

14 Claims, No Drawings

ULTRATHIN POLYMER ELECTROLYTE HAVING HIGH CONDUCTIVITY

CROSS REFERENCE TO RELATED APPLICATIONS

This application is a continuation of U.S. application Ser. No. 07/530,497, filed May 30, 1990, which is a continuation of U.S. application Ser. No. 07/243,357, filed Sep. 12, 1988, both now abandoned.

BACKGROUND OF THE INVENTION

The present invention relates to an ion conducting polymeric composition and its use as an electrolyte in an electrochemical cell.

U.S. Pat. No. 4,303,748 to Armand et al describes an electrochemical cell in which the electrolyte is a solid solution of an alkali metal salt within an uncrosslinked polymer derived from one or more monomers having heteroatoms.

European Patent Application 01 145 498 to Cook et al teaches an electrolyte composition including a plasticizer (in addition to the materials described by Armand) to prevent the polymer from converting from an amorphous phase to a crystalline phase having lower conductivity than the amorphous phase. Among other plasticizing agents, the European Application discloses propylene carbonate, dimethyformamide and $\gamma$-butyrolactone. The European Application further discloses that the plasticizer is generally added in an amount of 5 to 60% by weight and most preferably 25 to 40% by weight.

SUMMARY OF THE INVENTION

The present invention relates to an electrolyte composition which is useful in providing a very thin electrolyte layer in an electrochemical cell such as a lithium—vanadium battery. The electrolyte composition of the present invention is characterized in that it is useful in providing very thin electrolyte layers, for example, electrolyte layers as thin as 5 microns, when it is melt extruded, solvent extruded, or solvent cast onto an anode or cathode half element.

The polymer electrolyte composition of the present invention comprises at least 65% by weight of a plasticizer, about 5 to 25% by weight of a thermoplastic or thermoset polymer which is derived in whole or in part from monomers having heteroatoms (e.g., oxygen or nitrogen atoms) such that the polymer is capable of dissolving alkali metal ions, and about 5 to 15% of an alkali metal salt which forms a solid solution in said polymer. The electrolyte composition of the present invention provides a polymeric network which is interpenetrated by the plasticizer and the dissolved salt.

The present invention also provides an ultrathin solid state electrochemical cell having an electrolyte layer formed from the aforementioned composition which layer is less than 100 microns thick and preferably about 15 to 40 microns thick.

The present invention also provides a process for forming an electrochemical cell wherein the aforementioned composition is coated by extrusion, solvent casting, or the like upon an electrode half element.

DETAILED DESCRIPTION OF THE INVENTION

Cathode and anode half elements useful in constructing the electrochemical cells of the present invention are known in the art. The most typical anode is the lithium anode prepared by providing a layer of lithium metal on a metal foil (such as nickel or copper) which functions as the current collector.

The cathode half element is a composite of an insertion compound, an electronically conductive filler, and the polymer electrolyte described above.

Insertion compounds known in the art are useful in cathode compositions of the invention. Typical examples of insertion compounds include transition metal oxides, sulfides, and selenides, such as $V_6O_{13}$, $TiS_2$, $MnO_2$, $MoS_3$, $Cr_3O_6$, $Li_xV_3O_8$, and $V_2O_5$. The preferred materials are vanadium oxides such as $V_2O_5$ and $V_6O_{13}$. The preferred vanadium oxide compound, $V_6O_{13}$, is prepared by the thermal decomposition of ammonium metavanadate.

For electronic conductivity, the cathode composition contains an electronically conductive filler, the most typical example of which is carbon black. For ionic conductivity one of the polymer electrolytes described herein is incorporated into the cathode composite. This composition is compounded in a know manner and coated on a layer of the polymer electrolyte described below or on a second metal foil member which functions as a current collector to provide the cathode.

The polymers used in the electrolyte composition of the present invention may be thermoplastic or thermoset. General examples of useful polymers are described in U.S. Pat. No. 4,303,748 to Armand and European Application 0 145 498 to Cook. These polymers have repeating units containing at least one heteroatom such as an oxygen or nitrogen atom. They can be represented as polymers having the repeating unit

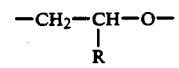

wherein R is hydrogen or a group Ra, —CH$_2$ORa, —CH$_2$OReRa, —CH$_2$N(CH$_3$)$_2$, in which Ra is an alkyl group containing 1 to 16 carbon atoms and preferably 1 to 4 carbon atoms or a cycloalkyl group containing 5 to 8 carbon atoms, and Re is an ether group of formula —CH$_2$—CH$_2$Op— wherein p is a number from 1 to 100, preferably 1 or 2: or having the repeating unit

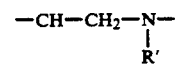

wherein R' is Ra, or ReRa, as defined above; or having the repeating unit

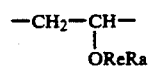

wherein Re and Ra are as defined above. Copolymers of the above polymers may also be useful.

These polymers are preferably crosslinked to form a network having enhanced mechanical properties and which is sufficiently rigid that agglomeration of the cathode is prevented as the cell is charged, discharged and recharged. Agglomeration leads to a longer diffusion path into the insertion compound and to destruction of the ionically and electronically conducting pathway among the particles.

The polymers may be crosslinked in a number of ways. For example, U.S. Pat. No. 4,357,401 to Andre et al. discloses PEO-PPO copolymers which are crosslinked by ethylene diamine. Where the polymer includes moieties of primary or secondary alcohols or amines, the polymer may be crosslinked by reaction with a crosslinking agent such as a polyisocyanate. Polyethylene oxides may also be crosslinked using a crosslinking agent such as poly(ethylene glycol) diacrylate and a thermal free radical initiator such as 2,2'-azobis(2-methylpropionitrile) as described in U.S. application Ser. No. 115,492 filed Oct. 30, 1987. See also U.S. Pat. No. 3,734,876.

Particularly useful polymerizable compounds for providing a crosslinked conductive matrix are obtained by reacting a low molecular weight polyethylene glycol (or polyamine (e.g., 200 to 400 m.w.) with acrylic or methacrylic acid to produce the ethylenically unsaturated ester. Also useful in the present invention are polymerizable materials such as acrylated epoxies, (e.g., Bisphenol A epoxy diacrylate), polyester acrylates, copolymers of glycidyl ethers and acrylates and vinyl compounds such as N-vinylpyrrolidone. The latter compound provides a non-conductive matrix. In selecting monomers, monomers are selected which do not adversely react with the anodic metal. Halogenated monomers such as vinyl chloride are preferably avoided. Monomers which react with the anodic metal, but which react with it very slowly may be used, but are less desirable.

Preferably, the aforementioned polymerizable polyethylenically unsaturated compounds have a molecular weight of about 200 to 2,000 and more preferably 200 to 800. Still more preferably they are liquids at temperatures less than 30° C. Examples of curable materials include polyethylene glycol-300 diacrylate (average PEO molecular weight about 300), polyethylene glycol 480 diacrylate (average PEO molecular weight about 480) and the corresponding methacrylates.

It may be desirable to include a polymerizable comonomer in the composition to reduce the glass transition temperature and improve the conductivity of the polymer. Any suitable monoacrylate such as tetrahydrofurfuryl acrylate, tetrahydrofurfuryl methacrylate, methoxypolyethylene glycol monomethacrylate, 2-ethoxyethyl acrylate, 2-methoxyethyl acrylate or cyclohexyl methacrylate may be used for this purpose. Triacrylates such at TMPTA, trimethylolpropane ethoxylated triacrylates (TMPEOTA) or trimethylolpropanepropoxy triacrylate may be used to introduce crosslinking. Monoacrylates may be used in an amount of about 5 to 50% by weight based on the total amount of polymerizable material. The triacrylates may be used in amounts of about 2 to 30% by weight on the same basis.

Examples of crosslinked but non-conductive supportive polymers are described in U.S. Pat. No. 4,654,279 to Bauer et al. and include epoxies, polyurethanes, polymethacrylates, polyacrylates, poyacrylonitrile, and polystyrene.

Known thermal polymerization or radiation polymerization techniques may be used to form crosslinked and uncrosslinked polymeric networks useful in the present invention. A conventional photoinitiator or thermal initiator is included in compositions which are cured by heating or exposure to ultraviolet radiation or visible light. Electron beam radiation can be used to cure compositions containing ethylenically unsaturated compounds directly without the addition of an initiator.

Alkali metal salts useful in the present invention as well know in the art and, include lithium, sodium, potassium, and ammonium salts. Preferred salts are lithium or sodium salts of anions selected from the group consisting of $I^-$, $Br^-$, $SCN^-$, $ClO_4^-$ $BF_4^-$, $PF_6^-$, $AsF_6^-$, $CF_3CO_2^-$, and $CF_3SO_3^-$. The most preferred salts are $LiClO_4$, $LiAsF_6$, $LiCF_3SO_3$, and $LiBF_4$.

Useful examples of plasticizers can be any aprotic solvent or mixture of aprotic solvents. Generally useful plasticizers have a relatively high dielectricity constant, e.g., greater than 6, low viscosity, a relatively high solvating power for lithium ions and are at least kinetically stable against one of the electrodes. Preferably, these materials are characterized by a boiling point greater than 75°. Low volatility simplifies manufacture. Representative examples are propylene carbonate, γ-butyrolactone, dimethyl sulfoxide, tetrahydrofuran and polyethylene glycol dimethyl ethers (glyme, diglyme, tetraglyme etc.)

In accordance with the present invention it is critical that the plasticizer be present in the electrolyte composition in an amount of at least 65% by weight and preferably 70 to 80% by weight. This criticality is illustrated in the following Table in which conductivity (ohm-$^1$cm-$^1$ at 20° C.) was measured for a polymer composition containing $LiCF_3SO_3$, polyethylene oxide (PEO) and propylene carbonate.

TABLE

| Sample No. | Weight Fraction | | | Ratio | | Conductivity |
| --- | --- | --- | --- | --- | --- | --- |
| | Salt | PEO | PC | PC/PEO | PC/salt | |
| 1 | .07 | .23 | .70 | 3.0 | 10.0 | $1.3 \times 10^{-3}$ Invention |
| 2 | .07 | .41 | .51 | 1.2 | 7.3 | $6.0 \times 10^{-4}$ Comparison |
| 3 | .07 | .32 | .60 | 1.8 | 8.6 | $4.8 \times 10^{-4}$ Comparison |
| 4 | .07 | .27 | .66 | 2.4 | 9.4 | $1.0 \times 10^{-3}$ Invention |

The Table shows that substantially higher conductivity is achieved at plasticizer concentrations greater than 65%. The balance of the composition is typically about 5 to 10% salt and 20 to 25% polymer.

The compositions of the present invention will not form free standing films but this is not necessary if the electrolyte compositions are coated directly on a support to form the anode or cathode half elements. Not only does this enable one to obtain a solid electrolyte having the high conductivities noted above, but it also enables the formation of a very thin electrolyte element. For example, whereas the electrolyte layers described in the aforementioned European application range from about 200 to 500 microns in thickness, electrolyte layers produced in accordance with the present invention are routinely less than 100 microns and preferably 15 to 50 microns thick.

The three-layer structure (anode, electrolyte and cathode with current collectors) in the form of a sheet, roll, tape, etc. forms a simple cell or battery. Such structures can employ various additional layers, including current conducting backing layers, insulating layers, and/or bipolar electrode connections. Such simple batteries may be connected or combined in stacks to form multi-cell electrochemical devices. Typically, electrochemical cells are formed as simple disc sandwiches. However, large area cells may be fabricated using a "swiss-roll" or "jelly roll" technique around a central mandrel, or a "concertina" configuration, sandwiched between two stainless steel plates. Both of these methods are well-known to the artisan.

EXAMPLE

A mixture of 23 wt % polyethylene oxide (PEO) 70% of propylene carbonate (PC) and 7% lithium trifluoromethane sulfonate, $LiCF_3SO_3$, was fed in a single screw type extruder equipped with an adjustable ribbon die (opening 50 um). The extruder and the die were maintained at temperature higher than the PEO melting temperature. This mixture was extruded as a continuous solid membrane directly on the electrodes (lithium or $V^6O^{13}$ composite) or on inert support. The electrolyte membrane thickness was about 50 to 75 um, depending on the extrusion speed and the die opening. The ionic conductivity at room temperature is about $1 \times 10^{-3}$ $ohm^{-1} cm^{-1}$.

Having described the invention in detail and by reference to preferred embodiments thereof, it will be apparent that modifications and variations are possible without departing from the scope of the invention defined in the appended claims.

What is claimed is:

1. An electrolyte composition for a solid state electrochemical cell comprising at least 65% by weight of a plasticizer, a polyethylene oxide polymer, and a dissolved alkali metal salt, wherein said plasticizer is a non-volatile aprotic solvent in which said alkali metal salt is soluble and is selected from the group consisting of propylene carbonate, gamma-butyrolactone, dimethyl sulfoxide, tetrahydrofuran, and propylene glycol dimethyl ethers.

2. The electrolyte composition of claim 1 wherein said salt is a lithium salt.

3. The electrolyte composition of claim 2 wherein said inorganic salt is a salt or an anion selected from the group consisting of $I^-$, $Br^-$, $SCN^-$, $ClO_4^-$ $BF_4^-$, $PF_6^-$, $AsF_6^-$, $CF_3CO_2^-$, and $CF_3SO_3^-$.

4. An electrochemical cell comprising a lithium anode, a composite cathode of an insertion compound, and a layer of a polymeric electrolyte wherein said electrolyte comprises at least 65% by weight of a plasticizer, a polymer consisting of a repeating unit selected from

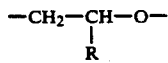

wherein R is hydrogen or a group Ra, $-CH_2ORa$, $-CH_2OReRa$, or $-CH_2N(CH_3)_2$, in which Ra is an alkyl group containing 1 to 16 carbon atoms or a cycloalkyl group containing 5 to 8 carbon atoms, and Re is an ether group of formula $-CH_2-CH_2Op-$ wherein p is a number from 1 to 100, or said polymeric material comprises a copolymer containing two or more such repeating units; and a dissolved alkali metal salt, wherein said plasticizer is a non-volatile aprotic solvent in which said alkali metal salt is soluble and is selected from the group consisting of propylene carbonate, gamma-butyrolactone, dimethyl sulfoxide, tetrahydrofuran, and propylene glycol dimethyl ethers.

5. The electrochemical cell of claim 4 wherein said plasticizer is selected from the group consisting of propylene carbonate, γ-butyrolactone, dimethyl sulfoxide tetrahydrofuran, and polyethylene glycol dimethyl ethers.

6. The electrochemical cell of claim 4 wherein said salt is a lithium salt.

7. The electrochemical call of claim 6 wherein said inorganic salt is a salt of an anion selected from the group consisting of $I^-$, $Br^-$, $SCN^-$, $ClO_4^-$ $BF_4^-$, $PF_6^-$, $AsF_6^-$, $CF_3CO_2^-$, and $CF_3SO_3^-$.

8. The electrochemical cell of claim 4 wherein said layer of said polymer electrolyte is less than 100 microns thick.

9. The electrochemical cell of claim 4 wherein said layer of said polymer electrolyte is about 15 to 50 microns thick.

10. An electrolyte composition for a solid state electrochemical cell comprising at least 65% by weight of a non-volatile aprotic solvent as a plasticizer; a polymer consisting of a repeating unit selected from:

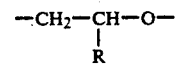

wherein R is hydrogen or a group Ra, $-CH_2ORa$, $-CH_2OReRa$, or $-CH_2N(CH_3)_2$, in which Ra is an alkyl group containing 1 to 16 carbon atoms or a cycloalkyl group containing 5 to 8 carbon atoms, and Re is an ether group of formula $-CH_2-CH_2Op-$ wherein p is a number from 1 to 100;

or said polymeric material comprises a copolymer containing two or more such repeating units; and a dissolved alkali metal salt;

wherein said plasticizer is a solvent in which said alkali metal salt is soluble, further characterized in that said polymeric material is radiation cured.

11. An electrolyte composition according to claim 10, further characterized in that said polymeric material is radiation cured.

12. An electrolyte composition according to claim 10 wherein said polymer is polyethylene oxide.

13. An electrolyte composition for a solid state electrochemical cell comprising at least 65% by weight of a plasticizer, consisting essentially of polyethylene oxide, a polyethylene glycol diacrylate or polyethylene glycol dimethacrylate and a dissolved alkali metal salt, wherein said plasticizer is a non-volatile aprotic solvent in which said alkali metal salt is soluble.

14. An electrolyte composition for a solid state electrochemical cell comprising at least 65% by weight of a plasticizer, consisting essentially of polyethylene oxide, a polyethylene glycol diacrylate or polyethylene glycol dimethacrylate, and a trimethylolpropane modified to include terminal acrylate or ethoxylated acrylate groups and a dissolved alkali metal salt, wherein said plasticizer is a non-volatile aprotic solvent in which said alkali metal salt is soluble.

* * * * *